Patented May 19, 1936

2,041,668

UNITED STATES PATENT OFFICE 2,041,668

PROCESS FOR DEHYDRATION OF ACETIC ACID AND OTHER LOWER FATTY ACIDS

Theodore O. Wentworth, Cincinnati, Ohio, assignor to The Vulcan Copper & Supply Co., Cincinnati, Ohio, a corporation of Ohio No Drawing. Application April 2, 1935,
Serial No. 14,257

9 Claims. (Cl. 260—122)

This invention relates to a process for the concentration of aqueous solutions of acetic acid, the removal of water therefrom, and the production thereby of substantially pure, "glacial" acetic acid.

Various solvent materials have been proposed for extracting acetic acid from its aqueous solutions by counter-current liquid contact. The acetic acid after extraction may be more readily recovered from the solvent than from the water originally present. Still other methods have concerned themselves with the distillation of the aqueous solution in the presence of an auxiliary liquid, which, by reason of its insolubility in water and the vapor pressure relations dependent thereupon, brings over the water in a low boiling vaporous mixture, sometimes called an "azeotropic" mixture. In this process (see for example Othmer U. S. Patent No. 1,917,391) it is usual practice to condense the vaporous mixture of water and withdrawing agent, separate the two layers of water and water insoluble third liquid respectively, discharge the water layer to waste (or to an auxiliary still for removing the trace of third liquid dissolved therein), and return the third liquid or withdrawing agent to the head of the column as reflux wash for the purpose of bringing over more water in a continuous operation.

I have found that thiophene is a satisfactory material to be used in either of these processes, or in the combined operation wherein, after systematic extraction of the aqueous acetic acid, the water dissolved with the acetic acid in the solvent layer is ejected in a so-called "azeotropic" distillation with the solvent itself.

The use of ethyl ether and isopropyl ether are old in the extraction process for acetic acid recovery. The use of either of these ethers in plant operations is accompanied by considerable losses due to the high rates of volatilization, and by using thiophene it is possible to almost entirely eliminate these losses. After the extraction operation is finished, the extracting solvent is found to contain, besides the acetic acid, an amount of water which is unavoidably dissolved. This amount of water will vary with each extracting material employed; and with the strength of acid in the original feed, and hence in the saturated solvent. I have found that the amount of water dissolved by thiophene is considerably less than the amount dissolved under the same conditions with either isopropyl ether or ethyl ether. This means that a drier acid is produced when the solvent is removed; or if anhydrous acid is desired in a second step, the cost of the second step will be reduced.

It is sometimes desirable to completely dehydrate the acid in a second step comprising the use of a so-called "azeotropic" distillation in which the extracting solvent itself is used as the withdrawing agent, for removing the water present at the completion of the extraction step. In this distillation operation, the condensate formed from the vapors passing over the head of the distilling column is separated into two layers comprising substantially pure water and substantially pure withdrawing agent respectively, and the former discharged to waste or to an auxiliary still for recovering the trace of withdrawing agent dissolved therein, while the latter is returned to the head of the still as reflux wash. In many cases, the azeotropic operation alone is used for removing the water, and the extracting step is omitted. I have found thiophene an ideal material for use under these conditions.

Ethyl ether does not have suitable properties to be useful as a withdrawing agent; and when isopropyl ether is so used, approximately 21 parts by weight of the ether must be distilled for every part of water removed. With thiophene on the contrary, approximately nine parts of thiophene must be distilled to remove one part of water. By taking into account the relative latent heats of vaporization, it follows that the additional amount of heat required for the withdrawing agent, is only about one-half as much for thiophene as for isopropyl ether. For the same reason, the capacity of the distilling column will be substantially increased.

Thiophene has considerable merit over ethyl acetate, another material old in the art for use as an extracting and/or azeotropic withdrawing material. Not only is ethyl acetate much less efficient as an extracting liquid since it dissolves considerably more water under the same conditions than thiophene but it has a considerably lower power for withdrawing water in an azeotropic distillation than thiophene, although it is somewhat better than isopropyl ether in this regard. An additional disadvantage of ethyl acetate is its tendency to hydrolyze to give ethyl alcohol which, in the mixture with ethyl acetate, still further reduces the latter's efficiency, both as an extracting and as a withdrawing agent. The ethyl alcohol so formed may be lost in greater or less amount along with the waste water, and this loss may constitute an appreciable factor in the cost of operation. Thiophene shows no tendency to hydrolyze under the conditions to be met with in either extraction or distillation, and may be used indefinitely without any loss due to decomposition.

I have also found that thiophene is useful for removing the water by extraction and/or azeotropic distillation from mixtures with other fatty acids such as formic, propionic and butyric or any mixture of two, three or four of these acids and water. In this regard, thiophene is particularly advantageous as compared to the esters, which have been widely used in the past, because of the tendency of esters to hydrolyze to give constituent alcohol and acid. The alcohol may then recombine with another acid under the conditions of operation to give a new ester which will have entirely different extractive characteristics, and, especially, a different boiling point. The second ester formed during the continual operation of the process may gradually build up (at the expense of the first) to such an amount that the process as originally operated becomes inoperative. As mentioned above, thiophene is entirely stable under the conditions of operation, and may be used indefinitely with any mixture of these acids, without decomposition or change in properties in any way.

It will be understood by those skilled in the art that many arrangements of standard equipment may be used to carry out the features of my invention, and will be within the spirit of my disclosure as limited and defined by the appended claims.

In particular it may be noted that any standard type of extractor and/or distilling column or columns which are efficient for this purpose may be used. The thiophene may be either a pure grade, or mixed with other materials not causing any derogatory action. The dilute acid may be fed into the distilling column or columns either in a liquid or vaporous state, and the discharged acid may be either partly or completely dehydrated and passed from the distillation system in either a liquid or vaporous condition.

Having described my invention, what I claim and desire to secure by Letters Patent, is as follows:

1. In the process of dehydrating aqueous solutions of one or more of the lower fatty acids, the use of thiophene for extracting the acid or acids from the water.

2. The process of dehydrating aqueous solutions of one or more of the lower fatty acids by distillation in the presence of thiophene, which acts as a withdrawing agent for the water.

3. The process for continuously separating water from its solution with one or more of the lower fatty acids, in which the dilute acid or acids is extracted with thiophene, the aqueous layer discharged after substantially complete exhaustion, the thiophene layer, containing substantially all of the acid or acids originally present and part of the water, passed to a column still in which the thiophene removes the water in an azeotropic distillation and the lower fatty acid or acids are discharged in a concentrated condition.

4. The process for separating water from a mixture with one or more of the lower fatty acids by distillation with thiophene in which the water and thiophene forms an azeotropic mixture in the still head, the vaporous azeotropic mixture condensed, the condensate separated into a water and a thiophene layer, the water layer discharged, the thiophene layer returned to the still head, to remove more water, and the process conducted so as to give concentrated fatty acid or acids.

5. In the process of dehydrating aqueous acetic acid, the use of thiophene for extracting the acetic acid from the water.

6. The process of dehydrating aqueous acetic acid by distillation in the presence of thiophene, said thiophene acting as a withdrawing agent for the water.

7. The process for continuously separating water from its solution with acetic acid, in which the dilute acid is extracted with the thiophene, the aqueous layer discharged after substantially complete exhaustion, the thiophene layer, containing substantially all of the acid originally present and part of the water, passed to a column still in which the thiophene removes the water in an azeotropic distillation and the acetic acid discharged in a concentrated condition from the column base.

8. The process for separating water from acetic acid by distillation with thiophene in which the water and thiophene forms an azeotropic mixture in the still head, the vaporous azeotropic mixture condensed, the condensate separated into a water and a thiophene layer, the water layer discharged, the thiophene layer returned to the still head to remove more water, and the process conducted so as to give concentrated acetic acid in the still pot.

9. The process for completely dehydrating a fatty acid in an aqueous solution by azeotropic distillation with thiophene as the withdrawing agent.

THEODORE O. WENTWORTH.